(No Model.)
W. H. WALLINGFORD.
TIRE TIGHTENER.
No. 599,373. Patented Feb. 22, 1898.
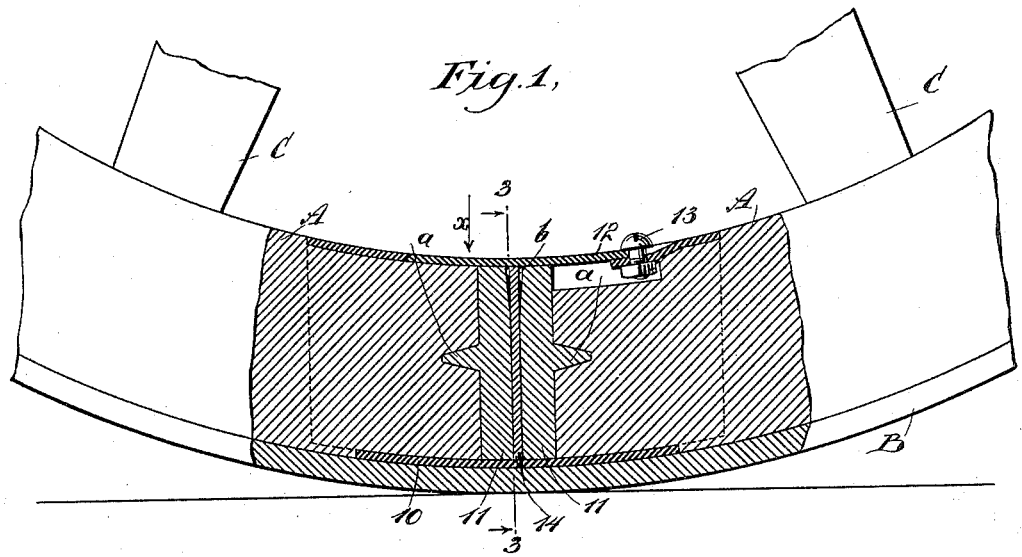
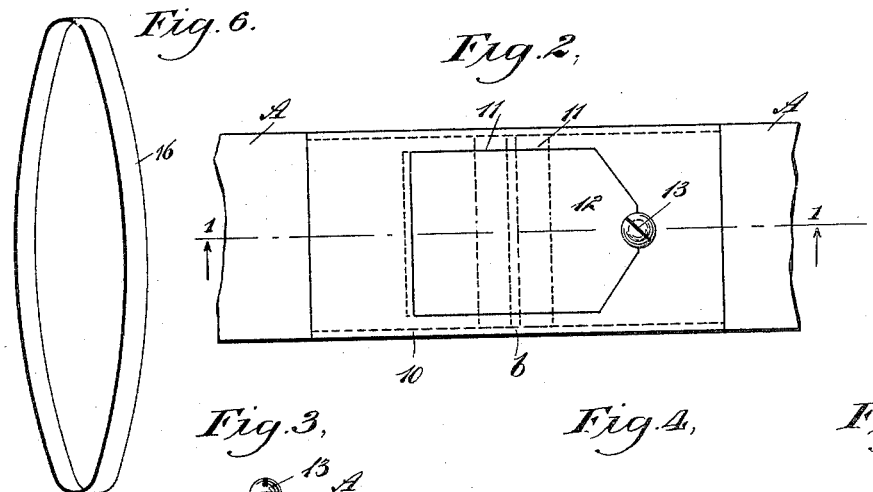
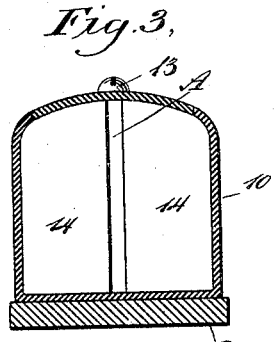
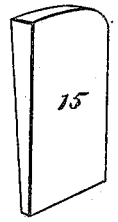
WITNESSES:
Edward Thorpe
Wm. P. Patton
INVENTOR
W. H. Wallingford
BY
ATTORNEYS.

UNITED STATES PATENT OFFICE.

WILLIAM H. WALLINGFORD, OF NEWPORT, KENTUCKY.

TIRE-TIGHTENER.

SPECIFICATION forming part of Letters Patent No. 599,373, dated February 22, 1898.

Application filed April 2, 1897. Serial No. 630,380. (No model.)

*To all whom it may concern:*

Be it known that I, WILLIAM H. WALLINGFORD, of Newport, in the county of Campbell and State of Kentucky, have invented new and useful Improvements in Tire-Tighteners, of which the following is a full, clear, and exact description.

This invention relates to means for tightening the tires of vehicle-wheels, and has for its object to provide a device of the indicated character which is simple, inexpensive, practical, and effective in use, and that may be readily adjusted to compensate for the expansion or contraction of the wooden fellies of a wheel by one who is not an expert mechanic.

The invention consists in the novel construction and combination of parts, as is hereinafter described, and defined in the claim.

Reference is to be had to the accompanying drawings, forming a part of this specification, in which similar characters of reference indicate corresponding parts in all the figures.

Figure 1 is a side view in part of a wheel-rim having the improvements, partly in section, on the line 1 1 in Fig. 2. Fig. 2 is an inner side view of a vehicle-felly in part, showing the improvement applied, seen in direction of the arrow $x$ in Fig. 1. Fig. 3 is a transverse section substantially on the line 3 3 in Fig. 1. Fig. 4 is a perspective view of a filling-plate forming part of the improvement. Fig. 5 is a perspective view of a wedge forming part of the device, and Fig. 6 is a perspective view of a lining-hoop which may be used with the improvement.

In the drawings that illustrate one application of the invention, A A represent adjacent end portions of the fellies for a wheel and which are engaged by the improved tire-tightener.

The improvement essentially consists of the following-described details of construction: A metal-casing sleeve 10 is provided that in the contour of its comparatively thin wall exactly conforms with that of the felly ends it encircles. The fellies A, transversely considered, are of the same dimensions as the cross-section of the casing-sleeve 10 and are so reduced in diameter where they engage with the sleeve that these ends of the fellies may be slidably inserted in the sleeve. When the described parts have been assembled, their outer surfaces should conform neatly and avoid unsightly offsets.

The inner side of the casing-sleeve 10 is apertured to afford means for the free introduction of two facing-blocks 11, and a cover-plate 12 is fitted upon the casing-sleeve and is secured thereto by the bolt 13, said plate covering the aperture in a neat and effective manner.

In constructing a wheel of which the felly portions A are a part the ends of the felly-sections are sufficiently separated from each other to permit an introduction of the facing-blocks 11 between them. The facing-blocks 11 are alike, and each consists of a metal or hard-wood block conforming in contour and dimension with the form and size of the interior cross-section of the sleeve 10.

A transverse rib $a$ is formed on each block 11, which ribs are embedded in cross-grooves formed to receive them in the end surfaces of the fellies A. The blocks 11 are preferably rendered parallel on their side faces and have such a relative thickness as will permit a crevice $b$ to intervene their adjacent surfaces when said blocks are in place within the sleeve 10, as shown in Fig. 1.

If the fellies A are formed of dry wood when the wheel is manufactured, similar filling-plates 14 are provided, as shown in Figs. 1, 3, and 4, two of these plates being employed for convenience in introducing them. The filling-plates 14 should be of such area and thickness as to neatly fill the crevice $b$, so that the shrinkage of the tire B in place on the fellies will draw all the joints together and bind the fellies upon the spokes C of the wheel. Should the fellies become so tightly compressed on the spokes as to draw the latter sidewise and give too much dish to the wheel, the liners or filling-plates 14 may be removed, which will relieve such a strain on the wooden portions of the wheel and let it come to a proper dish.

To take up looseness in the joints between the ends of the fellies A, a pair of wedges 15 is employed, the form of which is shown in Fig. 5. As indicated in Fig. 1, the facing-blocks 11 have their transverse and adjacent edges that are near the aperture of the sleeve 10 beveled, thereby facilitating the introduction of the wedges 15, that are to be driven into the crevice b through said aperture of the sleeve after the removal of the cover-plate 12.

It will be seen that the introduction of the wedges 15 will so spread apart the facing-blocks 11 and ends of the fellies they are in contact with that the tire B will be sufficiently tightened. It should be explained that if the wooden rim of the wheel consists of a single bent felly then but a single tire-tightening device may be used in conjunction with the ends of such a felly. However, should the wheel have a series of fellies in its rim then, if preferred, there may be a plurality of tire-tighteners of the improved construction employed to spread the parts of the wooden rim against the tire.

If a wheel is manufactured of wood that is not seasoned and therefore liable to contract considerably in dry weather, it may be of advantage to introduce a lining-hoop such as is represented in Fig. 6, this hoop 16 being slid between the tire B and felly or fellies of the wheel to partially take up the slackness and enable the insertion of the wedges 15, as before explained, to complete the tightening of the tire.

It will be evident that after the wedges 15 are driven completely into place within the casing-sleeve 10 the replacing of the cover-plate 12 will prevent a displacement of the wedges and thus render the tightening of the tire reliable. It is claimed for this improved tire-tightening device that it is extremely simple, very effective, easy to adjust, requires but few tools to effect an adjustment of the same, and does not require the services of a skilled mechanic to tighten the loose tires of one or more vehicle-wheels.

Having thus described my invention, I claim as new and desire to secure by Letters Patent—

A wheel having a felly with two contiguous ends, a sleeve inclosing said contiguous ends, the sleeve having an opening in its inner side and the sleeve having a portion depressed, such depressed portion being adjacent to one edge of the opening, a cover-plate fitting snugly within the opening and lying flush with the outer face of the sleeve, the cover-plate having a part lying over the depressed portion of the sleeve, a bolt passed through said depressed portion of the sleeve and engaging the cover-plate, two blocks respectively bearing against the contiguous faces of the felly, and means fitting between the blocks whereby to press the same apart, such means being capable of placement and displacement through the opening in the sleeve.

WILLIAM H. WALLINGFORD.

Witnesses:
RICHARD KUHN,
P. I. HOLMES.